July 29, 1969 E. ARO 3,458,658

NONBLOCKING SWITCHING SYSTEM WITH REDUCED NUMBER OF CONTACTS

Filed Sept. 14, 1965 3 Sheets-Sheet 1

INVENTOR
ENN ARO

BY Brown, Jackson, Boettcher & Dienner

ATTORNEY

July 29, 1969 E. ARO 3,458,658

NONBLOCKING SWITCHING SYSTEM WITH REDUCED NUMBER OF CONTACTS

Filed Sept. 14, 1965 3 Sheets-Sheet 2

INVENTOR
ENN ARO

BY Brown Jackson Boettcher & Dienner

ATTORNEY

INVENTOR
ENN ARO

BY Brown Jackson Boettcher Dienner

ATTORNEY

United States Patent Office 3,458,658
Patented July 29, 1969

3,458,658
NONBLOCKING SWITCHING SYSTEM WITH REDUCED NUMBER OF CONTACTS

Enn Aro, Columbus, Ohio, assignor, by mesne assignments, to New North Electric Company, Galion, Ohio, a corporation of Ohio Filed Sept. 14, 1965, Ser. No. 487,184
Int. Cl. H04j 3/02
U.S. Cl. 179—15 13 Claims

ABSTRACT OF THE DISCLOSURE

A three stage communication switching system for providing a nonblocking arrangement with a reduced number of crosspoints which serves a total of N lines divided into groups of "n" lines each. Each group of "n" lines is connected as inputs to a matrix which is individual to such group in the first switching stage. Each matrix in the first stage has a plurality of highways each of which leads to a different one of a plurality of matrices in the intermediate stage providing at least 2n–1 time division communication channels between each first stage matrix and the intermediate stage, and gates for connecting each input line selectively to each of the highways. The intermediate stage comprises the highways from the first stage, each of which is incoming from a different matrix in the first stage, a plurality of output highways, and gates for interconnecting each input highway to each output highway. The third stage includes a group of matrices each of which has an input highway from each matrix of the intermediate stage providing at least 2n–1 time division communication channels between the intermediate stage and each third stage matrix. Each matrix in the third stage has its outputs connected to the "n" lines of an associated one of the groups, different ones of the matrices in the third stage being connected to different ones of the groups, and gates for connecting each highway to each output line. In extending a connection over the system, control means simultaneously pulse a selected gate in the first, second and third stages during an available time slot.

The present invention relates to communication switching systems, and more particularly to a switching system having a reduced number of contacts for a given service load.

With the increasing use of electronic switching in the field, new and different problems have been encountered, and it has become necessary to develop switching networks which are more compatible with electronic switching equipment. In an article, "A Study of Non-Blocking Switching Networks," published in the Bell Telephone System Technical Publication, volume 32, March 1953, for example, it was pointed out that in certain systems, the roles of switching crossnet arrays are of more significance than in the more conventional types of commercial systems. In these systems the proportional cost of the common control equipment has decreased, whereas the crosspoints which now assume some of the control functions are responsible for a correspondingly increased portion of the costs. As a result, it has become a highly desirable object in the field to reduce the number of crosspoints in a system of such type while yet maintaining the ability to establish a maximum number of simultaneous connections.

It is an object of the present invention therefore to provide a novel "four-wire" system having a reduced number of crosspoints in which a connection may always be established regardless of the number of calls served by the system.

It is a further object of the invention to provide a novel "four-wire" system having a time division multiplex arrangement including highway systems to effect a reduced number of crosspoints.

It is a specific object of the invention to provide a nonblocking system for switching "N" inputs to "N" outputs, the "N" inputs being divided into "g" number of groups, each of which groups is comprised of "n" inputs; a first one of the switching stages comprising a "g" number of switching matrices, each of which matrice has its inputs connected respectively to the "n" inputs of one of the "g" groups, and each of which matrices has at least "2n–1" outputs comprised of a plurality "p" of time division multiplex highways, each having "t" slots, and means for selectively establishing connections between each of the "n" inputs and at least "2n–1" outputs from such matrix; a final switching stage comprises "g" switching matrices, each having its outputs connected respectively to the "n" outputs of "one" of the "g" groups of outputs and having at least "2n–1" inputs comprising a plurality "p" of time division multiplex highways and means for selectively establishing connection between at least said "2n–1" inputs and said "n" outputs, and at least one intermediate switching stage comprising "p" switching matrices, each of which has an output to each switching matrix of the third group, and means for selectively establishing connection between said inputs for said first group and said outputs for said third group.

These and other objects, advantages and features of the invention will be apparent to those skilled in the art from the following detailed description, taken in conjunction with the accompanying drawings, in which.

Figure 1:
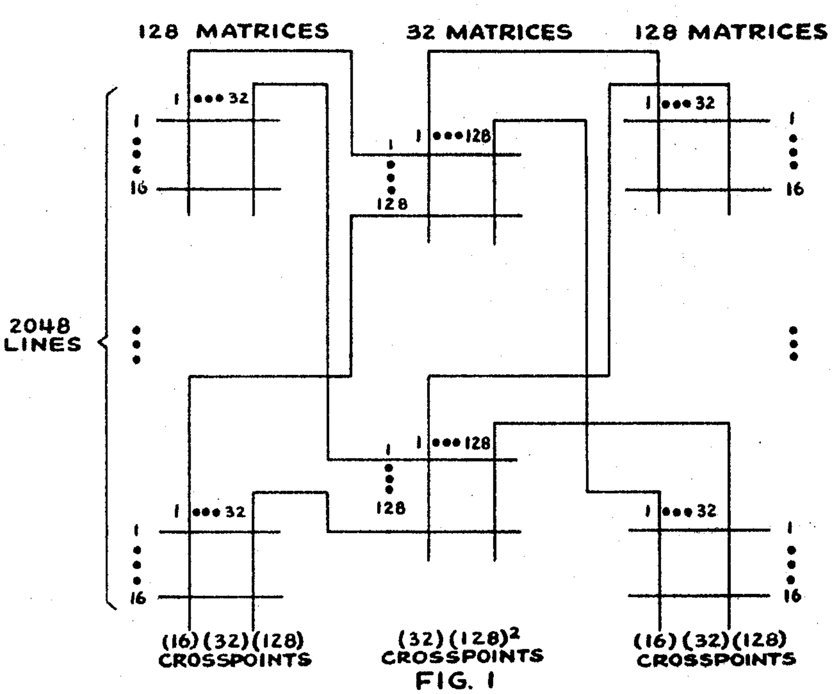
FIGURE 1 shows a non-blocking prior art space division system.

With reference to FIGURE 1, which is disclosed in more detail in the above identified publication, there is shown thereat a space division three-stage switching matrix for effecting the interconnection of 2,048 lines, each line having a branch incoming to the first stage and a branch outgoing from the third stage for cooperation with a four-wire circuit such as a four-wire telephone instrument. The 2,048 lines are divided into groups of sixteen lines to provide 128 groups, each of which require a switching matrix. Thus, there are 128 switching matrices on the left and 128 on the right.

According to the teaching of the above identified article, with sixteen lines in a group shown as horizontal inputs to a switching matrix, a non-blocking system may be provided with twice sixteen minus one number of verticals to a middle switching stage. For purposes of illustration, however, thirty-two verticals are shown, and as a result the center stage will comprise thirty-two switching matrices. Each matrix in the center stage comprises 128 horizontal inputs and 128 vertical outputs. Thus, the first switching stage will have a number of crosspoints equal to 16 x 32 x 128, and the middle stage will have 32 x 128 squared number of crosspoints. The third stage, as shown, will be arranged similarly to the first stage and will have 16 x 32 x 128 crosspoints.

Figure 2:
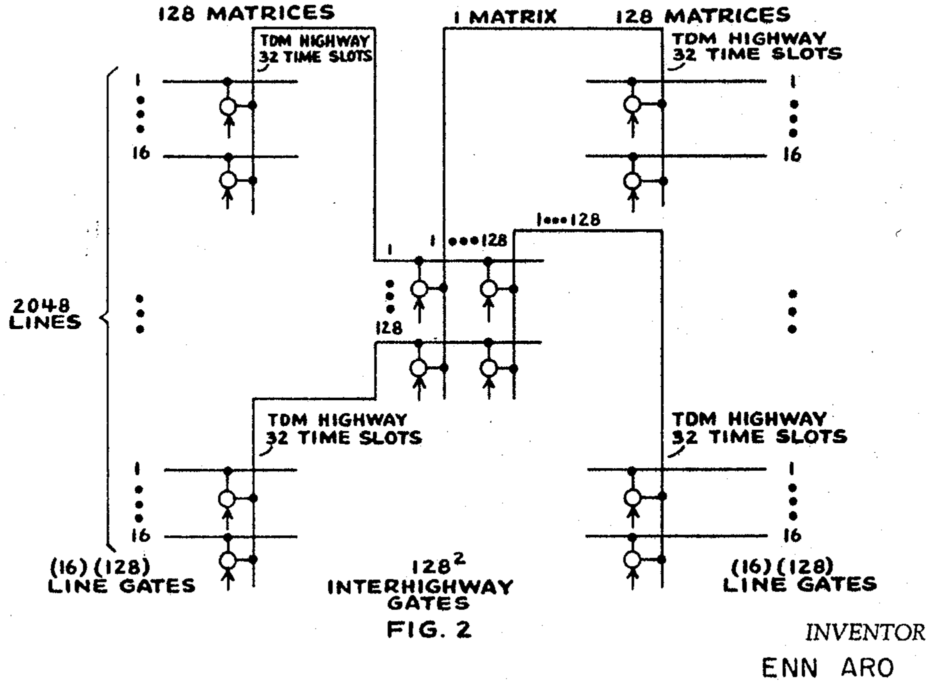
FIGURE 2 shows a non-blocking "four-wire" time division multiplex system.

With reference now to FIGURE 2, there is shown thereat a novel switching arrangement wherein a nonblocking "four-wire" time division multiplex (TDM) system is provided. As there shown, 2048 lines are divided into groups of sixteen lines, each group being connected to the "horizontals" of an associated matrix in the first stage of a three-stage switching arrangement. The input for each line, such as line 1 to the upper left switching matrix, actually comprises the input branch of a line which has a "four-wire" instrument associated therewith and, as indicated by a corresponding number the output branch is connected to the output of the "horizontals" in the third switching stage. Thus line 1 on the left of FIGURE 2 and line 1 on the right of FIGURE 2 each represent the incoming branch and outgoing branch respectively of the same line.

With reference to the vertical connections in the first illustrated matrix in the upper left of FIGURE 2, a single time division multiplex highway with thirty-two time slots is provided in lieu of the thirty-two vertical outputs shown in the upper left matrix of FIGURE 1. In a like manner, a single highway with thirty-two slots is provided for each of the 128 matrices representively shown at the left in FIGURE 2, and for each of the 128 matrices representively shown at the right in FIGURE 2. The second stages comprise a single 128 x 128 matrix (i.e., 128 horizontal inputs from the matrices of the first stage and 128 vertical outputs to the matrices of the third stage). Thus, a single gate in the single matrix in the second stage of FIGURE 2 can take the place of each of the thirty-two corresponding crosspoints of the thirty-two matrices of FIGURE 1 with a substantial saving in switching equipment.

With reference once more to the upper left matrix of FIGURE 2, each of the sixteen lines input thereto has access to the matrix time division multiplex highway via a gate which can be operated in any one of thirty-two time slots. Actually, to achieve non-blocking for the arrangement in FIGURE 2, the number of time slots must be twice the number of lines in a group minus 1; however, thirty-two time slots are provided for illustration.

It will be apparent that the first stage of switching matrices comprises $16\times128$ line gates and the second stage matrix requires $128^2$ interhighway gates. Similarly, consideration of the third stage matrices will show that this stage comprises $16\times128$ line gates. The total number of line gates plus interhighway gates for the arrangement of FIGURE 2 in a nonblocking embodiment will be found to be 20,480. Inasmuch as each line matrix has twice as many time slots as lines, and inasmuch as the middle matrix is a square matrix whereby each incoming highway thereto has access to each outgoing highway therefrom, the arrangement of FIGURE 2 is nonblocking while yet requiring substantially less switching equipment than the arrangement of FIGURE 1.

Figure 3:
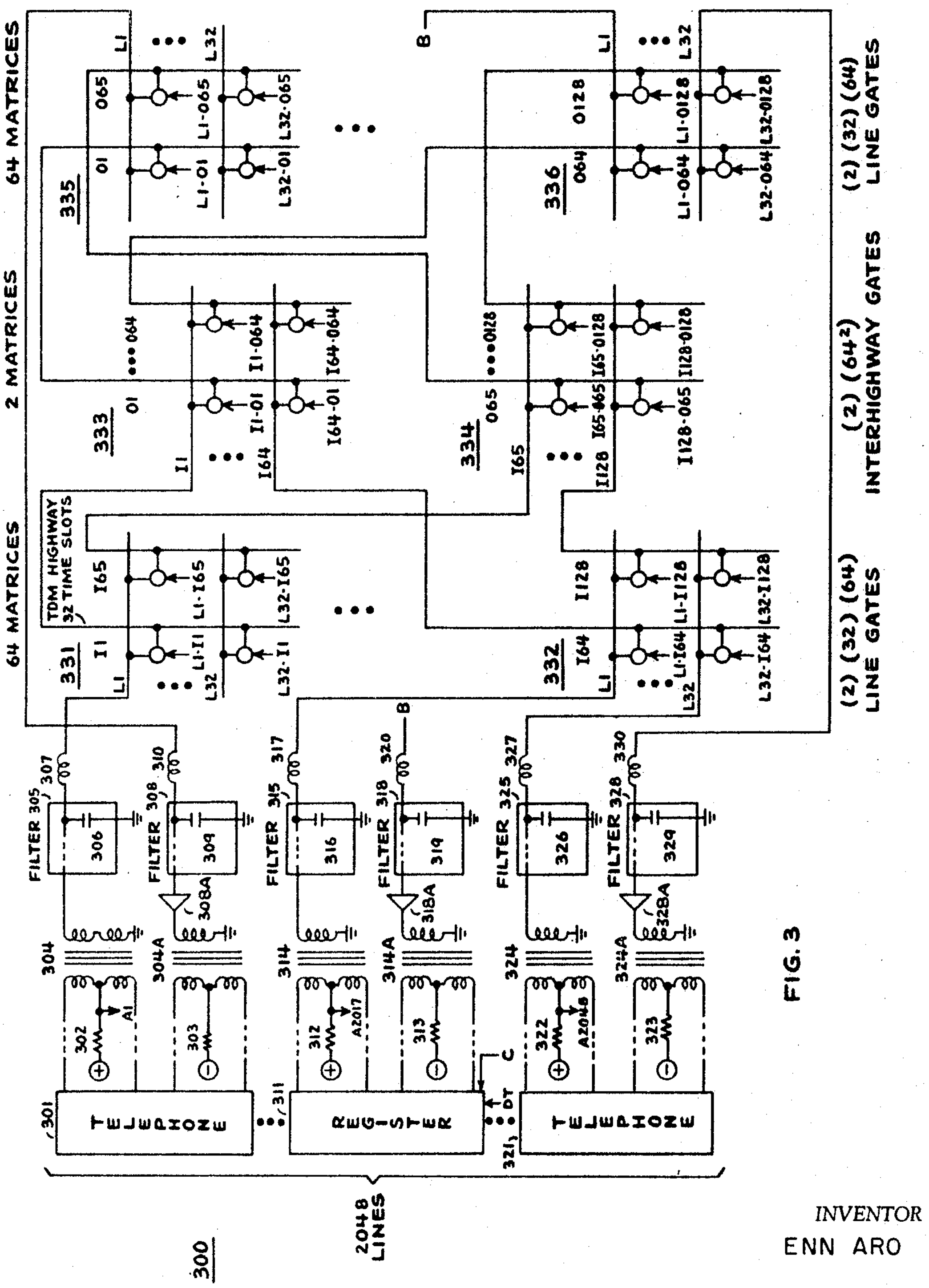
FIGURES 3 and 4 show a redundant non-blocking "four-wire" time division multiplex system with a reduced number of contacts.

With reference now to FIGURE 3, a three-stage switching arrangement having 2048 lines input thereto is illustrated thereat. The first line is illustrated as having a telephone instrument 301 connected thereto which is connected over four conductors shown in dotted line to a central switching office. The upper transmitting pair of conductors are connected to the terminal ends of a center tapped primary winding on a transformer 304, the center tap of which is connected via resistor 302 to positive potential. The center tap is further connected to provide a scanning point, designated A1. The lower receiving pair of conductors are connected to the terminal ends of a center tapped winding on transformer 304A, the center tap of which is connected via resistor 303 to negative battery.

The secondary of transformer 304 comprises two series windings, having the lower end of the lower winding grounded, which cooperate with the primary winding and are connected to filter 305 which, as shown, includes a condenser 306 connected to ground. This filter may be that shown in U.S. Patent No. 3,100,820, which issued to Carl Gunnar Svala and Enn Aro on August 13, 1963. The output of filter 305 is supplied from the top plate of condenser 306 through inductor 307 to the line L1 input to matrix 331. In a similar manner, the secondary of transformer 304A is connected via amplifier 308A to filter 308 which includes a condenser 309 connected at one end to ground, and at the other end through inductor 310 to output line L1 of matrix 335.

The 2048 lines are divided into groups of thirty-two as will be shown. A register 311 may be connected to a line, such as the first line of the last group of thirty-two lines, for example. The input connections thereof are similar to those already described for the telephone set 301, the inductor 317 associated therewith being connected to input line L1 of matrix 332 and inductor 320 thereof being connected to outgoing line L1 of matrix 336 in the third switching stage via the connection indicated as "B." A further telephone set 321 is shown as connected to the last line of the last group, the inductor 327 associated therewith being connected to the input line L32 of matrix 332, and inductor 330 thereof being connected to the outgoing line L32 of matrix 336.

With thirty-two lines input to each of the matrices in the first switching stage, a total of sixty-four such matrices are required; however, to obtain a non-blocking system with thirty-two lines input to a matrix, there are provided sixty-four outputs comprising thirty-two time slots on the first highway, such as I1, and thirty-two time slots on a second highway, such as I65. As will be shown, highways I1–I64 are a part of a first system and highways I65–I128 are a part of a second system, each highway of which is an output from the first switching stage and an input to the second switching stage. As each matrix, such as 331, in the first stage has two output highways, such as I1, I65, which go to the second stage, the second stage will comprise two matrices 333, 334, each of which matrices has sixty-four inputs and sixty-four outputs. The inputs to the upper matrix 333 of the second stage are connected to outputs from each of the matrices in the first stage on a highway I1 through I64 and the outputs of matrix 333 are connected via highways 01 through 064 to inputs on the third stage. The lower matrix 334 of the second stage has inputs connected to outputs of each of the matrices in the first stage via highways I65 through I128 and outputs connected to inputs to the matrices of the third stage via highways 065 through 0128.

With reference now to the highways of the three stages, highways I1 through I64 and 01 through 064 together comprise a first highway system; and highways I65 through I128 and 065 through 0128 comprise a redundant second highway system.

As will be apparent from the drawings, each matrix crosspoint in each of the switches in each of the stages locates a switching gate. Referring to the first stage of switching, the number of crosspoints and line gates will be found to be $2\times32\times64$. In the second stage, the number of interhighway gates is found to be $2\times64^2$. In the third stage the number of crosspoints and line gates will be found to be $2\times32\times64$. The sum of line gates and interhighway gates of switching arrangement 300 thus will be found to be 16,384, which amounts to a reduction in number of gates of about twenty percent with respect to FIGURE 2, while yet providing a non-blocking time division multiplex system.

Figure 4:
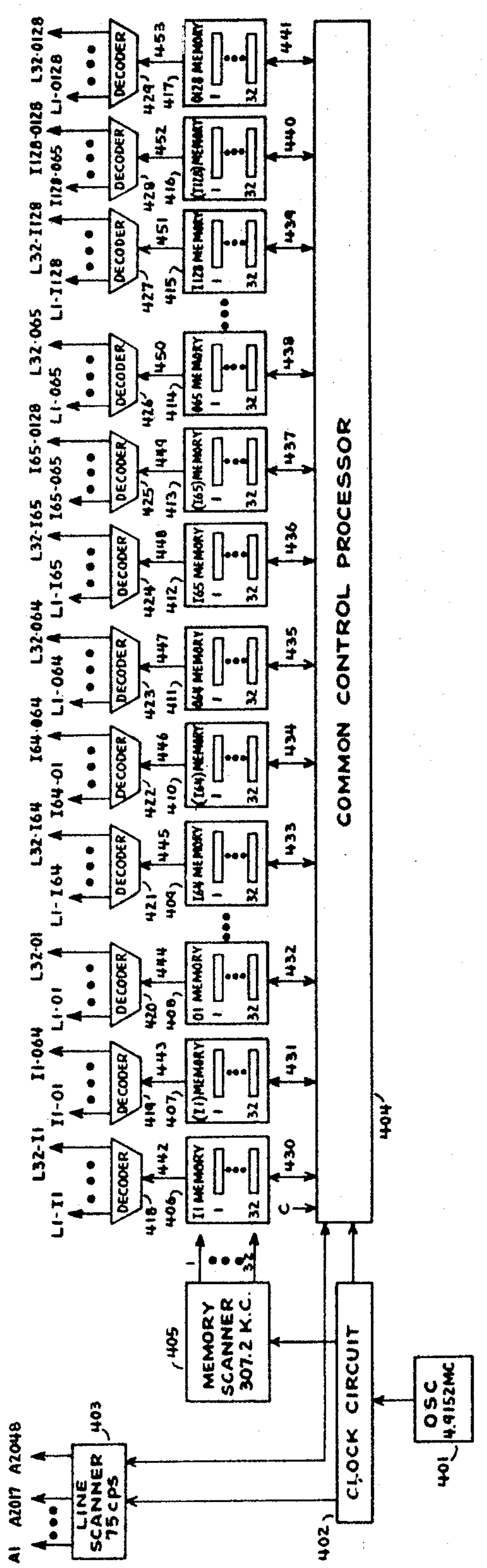

Referring now to FIGURE 4, a control system for scanning the lines and operating the gates of the system shown in FIGURE 3 is schematically shown thereat. As there illustrated, a 4.9152 mc. oscillator 401 is used to gate the system and also to operate the clock circuit 402 which provides various submultiples of the fundamental frequency, enabling the line scanner 403 to scan the points A1–A2048, associated with the various lines, at a 75 cycle per second rate. The clock circuit 402 also controls the common control processor 404 which cooperates with highway memories 406–417 in a manner to be shown, and enables the memory scanner 405 to scan over its outputs 1–32 to the memories 406–417 at a 307.2 kc. rate, each output thereby being scanned at a 9.6 kc. rate.

Memory 406, which is the I1 memory, via decoder 418 controls gates L1–I1 through L32–I1 (FIGURE 3) in the first matrix of the first switching stage associated with lines L1–L32 and connected to incoming highway I1 (i.e., the first highway).

Memory 407, designated (I1) memory, via decoder 419, controls gates I1–01 through I1–064 in the first matrix of the second switching stage associated with interhighway contacts between incoming highway I1 and outgoing highways 01–064 for such matrix.

Memory 408, designated 01 memory, via decoder 420 controls gate L1–01 through L32–01 in the first matrix of the third switching stage connected to lines L1–L32 and outgoing highway 01.

The further memories of this set will be apparent and save for the last group of memories 409, 410 and 411 are represented by the spaced dots in FIGURE 4. Memory 409, designated I64 memory, via decoder 421 controls gates L1–I64 through L32–I64 in the last matrix of the first switching stage which connect lines L1 through L32 associated with incoming highway I64 to this highway. Memory 410, designated (I64) memory, via decoder 422 controls gates I64–01 through I64–064 in the first matrix of the second switching stage which control interhighway gates between incoming highway I64 and outgoing highways, 01–064. Memory 411, designated 064 memory, via decoder 423 controls gates L1–064 through L32–064 in the last matrix of the third switching group which connects lines L1–L32 to outgoing highway 064.

Memories 412–417 are associated with the second system of highways which provide the redundancy set forth in more detail hereinafter. More specifically, memory 412, designated I65 memory, via decoder 424 controls gates L1–L65 in the first matrix of the first switching stage which controls the connection of lines L1–L32 to incoming highway I65. Memory 413, designated (I65) memory, via decoder 425 controls gate I65–065 through I65–0128 in the second matrix of the second stage which control the connection of highway I65 to outgoing highways 065 through 0128. Memory 414, designated 065 memory, via decoder 426 controls gates L1–065 through L32–065 in the first matrix of the third stage which control the connection of output lines L1–L32 associated with outgoing highway 065 to this highway.

Memory 415, designated I128 memory, via decoder 427 controls gates L1–I128 through L32–I128 in the last matrix 332 of the first stage which control the connections of lines L1–L32 associated with matrix 332 to incoming highway I128. Memory 416, designated (I128) memory, via decoder 428 controls gates I28–065 through I128–0128 in the second matrix 334 of the second stage which control the connection of the incoming highway I128 to outgoing highways 065–0128, and memory 417, designated 0128 memory, via decoder 429 controls gates L1–0128 through L32–0128 in the last matrix 336 in the third stage which control the connection of lines L1–L32 associated with matrix 336 to outgoing highway 0128.

While two sets of memories in the first system and two sets in the second system are shown in the drawings, it will be apparent from the disclosure that there are sixty-four such sets in each system.

SPECIFIC DESCRIPTION

Assuming now, for illustration purposes, that a subscriber at telephone 301 desires to call the subscriber at telephone 321, as the subscriber at telephone 301 lifts his hand set, a loop is completed from positive potential over resistor 302 via the two primary windings of transformer 304 in parallel through the closed loop in the telephone, and out over the two primary windings of transformer 304A and resistor 303 to negative talking battery. As the loop is completed, the potential at point A1 changes and as the scanner 403 in its scan contacts the point A1 and detects such change in potential, the system is informed that the line 301 went off-hook. That is, the line scanner 403 contains a memory which remembers the prior condition of all lines at all times, and when, as in this case, a change in the potential at a scanning point is observed, the scanner ascertains the nature of the change.

In the present example, the line scanner 403 notifies the common control processor 404 that telephone 301 went off-hook. Thereupon, common control processor 404 and memory scanner 405 operate to effect connection of line 301 to a register such as register 311.

By way of example, the path outgoing from telephone 301 may be completed via outgoing inductor 307, line L1 of matrix 331, gate L1–I1, incoming highway I1, gate I1–064 of matrix 333, outgoing highway 064, gate L1–064, line L1 of matrix 336, via the connection designated "B," to incoming inductor 320, associated with filter 318 of register 311. The path outgoing from register 311 may be completed for example over inductor 317, line L1 of matrix 332, gate L1–I64, gate I64–01 of matrix 333, gate L1–01 of matrix 335, outgoing line L1 of this matrix to incoming inductor 310 and filter 308 of telephone 301.

In establishing such connection, gates L1–I1, I1–064, and L1–064 will be operated in the same time slot of the thirty-two time slots of the system. Similarly, gates L1–I64, I64–01, and L1–01 will be operated in a common time slot which may or may not be the same time slot of the system.

That is, in effecting the assignment of time slots in such manner, the common control processor 404 contains memory equipment which keeps tally of the status of the time slots of each highway. When the memory scanner 405, as the result of a scan, signals the common control processor 404 that telephone 301 went off-hook, the common control processor 404 being informed that line 301 is associated with highway I1 and knowing which time slots are idle on highway I1, as well as the registers which are idle, and the highways with which the registers are associated and which time slots are idle on such highway, thereupon selects an idle time slot common to the highway of the calling line and an idle register. Assuming that time slot 1 is thus selected, processor 404 via path 430 inserts the information "L1" in the time slot 1 memory of the I1 memory 406 which memory may comprise a word-oriented core memory having five elements to give $2^5$ combinations. Processor 404 via path 443 also inserts the information "064" in the time slot 1 memory of the (I1) memory 407 which memory may comprise a word-oriented core memory having six elements to give $2^6$ combinations. Processor 404 via path 435 inserts the information "L1" in the time slot 1 memory of the "064" memory 411 which has five elements to give $2^5$ combinations.

The memory scanner 405 continually scans the time slot 1-time slot 32 memories in each of the memories 406–417 in unison. Each time scanner 405 arrives at time slot 1 in its scan, the output of the time slot 1 memory of I1 memory 406 enables decoder 418 to operate gate L1–I1. Similarly at the same time, memory 407 enables decoder 419 to operate gate I1–064, and memory 411 enables decoder 423 to operate gate L1–064.

Assuming that time slot 32 is assigned to the receiving connection of telephone 301, processor 404 via path 433 inserts the information "L1" in the time slot 32 memory of the I64 memory 409; via path 434 inserts the information "01" in the time slot 32 memory of the (I64) memory 410; and via path 432 inserts information "L1" in the time slot 32 of the (01) memory 408.

Each time scanner 405 arrives at time slot 32 in its scan, the output of the time slot 32 memory of 409 enables decoder 421 to operate gate L1–I64. In like manner, at the same time, memory 410 enables decoder 422 to operate gate I64–01, and memory 408 enables decoder 420 to operate gate L1–01.

With outgoing and incoming connections established between telephone 301 and register 311 using resonant transfer techniques, dial tone from lead DT is sent from register 311 via transformer 314, filter 315, inductor 317, line L1 of matrix 332, gate L1–I64, incoming highway I64, gate I64–01, outgoing highway 01, gate L1–01, line L1 of matrix 335, inductor 310, filter 308, and over amplifier 308A and transformer 304A to telephone 301, to inform the calling subscriber by the dial tone signal to dial the called number.

Thereupon the calling subscriber dials the called number, which by resonant transfer technique is transmitted to the register 311 via transformer 304, filter 305, inductor 307, line L1, gate L1–I1 of matrix 331, incoming highway I1, gate I1–064, outgoing highway 064, gate L1–064, line L1 of matrix 336, via connection designated "B," inductor 320, filter 318, and transformer 314A to register 311. As soon as the first digit is received, register 311 disconnects dial tone.

When all digits of the called number have been received, register 311 transmits identity of the called line to processor 404 over the path designated "C." Thereupon, processor 404, knowing the identity of the calling line, and the called line erases the identity of the lines and highways used for establishing the connection from the calling line to the register from the memories of the group 306–417 which were employed. Scanner 405 in its subsequent scanning will not thereafter cause the associated connecting gates to be operated.

Thereupon, processor 404 signals selected ones of the memories 406–417 to set up a ringing connection to the called telephone and a ring-back connection to the calling telephone much in the manner in which the connection was extended to the register. Since such portion of the disclosure is peripheral to the invention the details thereof are not disclosed hereat.

When the called party answers, scanner 403 notifies processor 404 which removes the ringing and ring-back connection information from memories 406–417, and signals selected ones of the memories 406–417 to interconnect the calling and called phones for communication purposes.

More specifically, for purposes of example, it will be assumed that processor 404 assigns a time slot, such as 32, idle in common to highways I65 and 0128; and a time slot, such as 1, idle in common to highways I64 and 01. Processor 404 via path 436 stores "L1" in the time slot 32 memory of the I65 memory 412, whereby decoder 424 operates gate L1–I65; via path 437 stores "128" in the time slot memory 42 of (I65) memory 413 whereby decoder 425 operates gate I65–0128; via path 441 stores "L32" in time slot memory 32 of the "0128" memory 417 whereby decoder 429 operates gate L32–0128. As a result, with operation of the designated gates, a communication path is established from telephone 301 to telephone 321. Processor 401 also via path 433 stores "L32" in the time slot 1 memory of the I64 memory 409, whereby decoder 421 operates gate L32–I64; via path 434 stores "01" in the time slot 1 memory of the (I64) memory 410, whereby decoder 422 operates gate I64–01; and via path 432 stores "L1" in the time slot 1 memory of the 01 memory 408, whereby decoder 420 operates gate L1–01. As a result a communication path is established from telephone 321 to telephone 301.

When the receiver is replaced on either the calling or called telephone, the scanner 403 notifies the processor 404 of the hang-up. Thereupon, the processor 404 discontinues the connections, and (by means not shown) connects the other telephone to busy tone until the subscriber thereat replaces the receiver.

In summary, in FIGURE 2 the 2,048 lines were placed in groups of sixteen lines, each with one time division multiplex highway of thirty-two time slots for each line group, giving a non-blocking arrangement. In FIGURE 3, the 2,048 lines were placed in groups of thirty-two lines each with two time division multiplex highways of thirty-two time slots each for each line group, giving a non-blocking arrangement, with a lesser total number of line and interhighway gates.

If, now, the 2,048 lines are placed in groups of 48 lines each with three time division multiplex highways of thirty-two time slots each for each line group, a non-blocking arrangement also will be had. However, in such event the total number of line and interhighway gates will be found to be 17,835 which is less than that of FIGURE 2 but more than that of FIGURE 3.

The following analysis will show that the time division multiplex arrangement with two highway systems (i.e., two matrices in the second stage) for the described particular case is optimum.

Let N be the total number of lines (2,048)

Let $t$ be the number of time slots per highway (32)

Let $p$ be the number of "highway systems"

Then $t/2$=the number of lines per highway pair (outgoing and incoming highways associated with group of lines)

Then $\frac{N}{t/2}=\frac{2N}{t}$=the number of highway pairs $\frac{\frac{2N}{t}}{p}=\frac{2N}{tp}$=the number of highway pairs per system.

N.2$p$=the number of line gates $p\left(\frac{2N}{tp}\right)^2=\frac{4N^2}{pt^2}$=the number of interhighway gates $\Sigma=2pn+\frac{4N^2}{pt^2}$=the total number of gates.

Differentiating to find minimum systems for this number of gates:

$$\frac{d\Sigma}{dp}=2N-\frac{1}{p^2}\cdot\frac{4N^2}{t^2}$$

$$\text{If } 2N-\frac{1}{p^2}\cdot\frac{4N^2}{t^2}=0$$

$$\frac{1}{p^2}\cdot\frac{4N^2}{t^2}=2N$$

$$\frac{1}{p^2}=\frac{2Nt^2}{4N^2}=\frac{t^2}{2N}$$

$$p^2=\frac{2N}{t^2}$$

$$p=\sqrt{\frac{2N}{t}}$$

For the example given with $N$=2,048 and $t$=32

$$p=\sqrt{\frac{4096}{32}}=\frac{64}{32}=2$$

which is the system shown in FIGURE 3.

The novel system of the present disclosure in addition to providing nonblocking service, also provides increased reliability through the redundancy which is obtained in use of the multiple highway system. Furthermore, in non-blocking systems using multiple highway systems the traffic handling capability is increased over that achieved with a single highway system. It is apparent that these foregoing advantages including improved service and reliability can be obtained by use of the disclosure of the present invention without necessarily including the non-blocking feature. In summary, by using the multiple stage switching arrangement of the disclosure, more reliable service is obtained with a smaller number of cross-point contacts.

While only a particular embodiment of the invention has been disclosed and claimed, it is apparent that modifications and alterations may be made therein, and it is intended in the appended claims to cover all such modifications and alterations as may fall within the true spirit and scope of the invention.

What is claimed is:

1. In a communication switching system comprising a plurality of groups of lines, each of which groups is comprised of an "$n$" number of lines, a first group of matrices, each of which matrices has a plurality of input circuits connected to the lines of an associated one of said groups, time divided output highway means comprised of at least $2n-1$ channels, and a plurality of gate means, each of which is selectively operative to connect a different input circuit to an output highway from its matrix; at least one intermediate matrix having a plurality of input circuits, each of which is connected to a highway from a different matrix in said first group, a plurality of highway output circuits for said one intermediate matrix, and a plurality of gate means for selectively interconnecting the input and output circuits of said intermediate matrix, and a third group of matrices, each of which includes a plurality of input circuits and a plurality of output circuits, each of which input circuits is connected to one of said highway output circuits for said intermediate matrix, there being at least $2n-1$ channels input to each matrix of said third group, the output circuits of each matrix of said third group being connected to the lines of an associated one of said groups of lines, and a plurality of gate means for each matrix of said third group, each of which is selectively operative to establish a connection between one of the input circuits for its matrix and one of said output circuits for its matrix which is connected to one of said lines in its associated group of lines.

2. In a communication switching system comprising a plurality of groups of lines, each of which groups is comprised of "$n$" number of lines, each of which lines has an incoming branch and an outgoing branch, a first group of matrices, each of which matrices has a plurality of input circuits connected to the incoming branch of the lines of an associated one of said groups, time divided output highway means for each matrix in said first group having at least $2n-1$ channels, and a plurality of gate means, each of which is selectively operative to connect a different input circuit to an output highway from its matrix; at least one intermediate matrix having a plurality of input circuits, each of which is connected to a highway from a different matrix in said first group, a plurality of highway output circuits for said intermediate matrix and a plurality of gate means for selectively interconnecting the input and output circuits of said intermediate matrix, and a third group of matrices, each of which includes a plurality of input circuits and a plurality of output circuits, each of which input circuits is connected to one of said highway output circuits for said intermediate matrix, there being at least $2n-1$ channels input to each matrix of said third group, the output circuits of each matrix of said third group being connected to the outgoing branches of the lines of a different one of said group of lines, and a plurality of gate means for each matrix of said third group, each of which is selectively operative to establish connection between an input circuit for its matrix which is connected to one of the highway outputs of said intermediate matrix and one of said output circuits for its matrix which is connected to one of said lines in its associated group of lines.

3. A switching system as set forth in claim 2 in which said incoming branches for each of said lines include a storage capacitor and an inductor connected in a resonant transfer circuit and each of said outgoing branches include a storage capacitor and inductor connected in a resonant transfer circuit.

4. In a communication switching system comprising a plurality of "N" lines divided into groups, each having an "$n$" number of lines, a first group of matrices, each of which matrices has a plurality of "$n$" input circuits connected to the lines of an associated one of said groups, a "$p$" number of time divided output highways in which "$t$" is the number of time slots per highway and $p=\sqrt{N/t}$, and a plurality of gate means, each of which is selectively operative to connect a different input circuit to an output highway from its matrix; at least one intermediate matrix having a plurality of input circuits, each of which is connected to a highway from a different matrix in said first group, a plurality of highway output circuits for said intermediate matrix and a plurality of gate means for selectively interconnecting the input and output circuits of said intermediate matrix, and a third group of matrices, each of which includes a plurality of input circuits and a plurality of output circuits, each of which input circuits is connected to one of said highway output circuits for said intermediate matrix, there being at least $2n-1$ channels input of each matrix of said third group, the output circuits of each matrix of said third group being connected to the lines of an associated one of said group of lines, and a plurality of gate means for each matrix of said third group, each of which is selectively operative to establish a connection between an input circuit for the matrix which is connected to one of the highway outputs of said intermediate matrix and one of said output circuits which is connected to one of said lines in its associated group of lines.

5. In a communication switching system comprising a plurality of groups of lines, each of which groups is comprised of an "$n$" number of lines, a first group of matrices, each of which matrices has a plurality of input circuits connected to the lines of an associated one of said groups, a plurality of time divided output highways and a group of gate means connected to each output highway, each of which gates of a group is selectively operative to connect a different input circuit to the associated highway; at least one intermediate matrix having a plurality of input circuits, each of which is connected to a highway from a different matrix in said first matrix group, a plurality of highway output circuits for said one intermediate matrix and a plurality of gate means for selectively interconnecting the input and output circuits of said intermediate matrix, and a third group of matrices, each of which includes a plurality of input circuits and a plurality of output circuits, each of which input circuits is connected to one of said highway output circuits for said intermediate matrix, there being at least $2n-1$ channels input to each matrix of said third group, the output circuits of each matrix of said third group being connected to the lines of a different one of said group of lines, and a plurality of gate means for each matrix of said third group, each of which is selectively operative to establish a connection between an input circuit for the matrix which is connected to one of the highway outputs of said intermediate matrix and one of said output circuits which is connected to one of said lines in its associated group of lines.

6. A switching system as set forth in claim 5 in which the total number of channels in the output highways for each matrix of said first group is at least $2n-1$ channels.

7. In a communication switching system comprising a plurality of groups of lines, each of which groups is comprised of an "$n$" number of lines, each of which lines includes an incoming branch having a resonant transfer circuit and an outgoing branch including a resonant transfer circuit, a first group of matrices, each of which matrices has a plurality of input circuits connected to the lines of an associated one of said groups, at least one time divided output highway comprised of $2n-1$ channels, and a plurality of gate means, each of which is selectively operative to connect a different input circuit to an output highway from its matrix; at least one intermediate matrix having a plurality of input circuits, each of which is connected to a highway from a different matrix in said first group of matrices, a plurality of highway output circuits for said intermediate matrix, and a plurality of gate means for selectively interconnecting the input and output circuits of said intermediate matrix and a third group of matrices, each of which includes a plurality of input circuits and a plurality of output circuits, each of which input circuits is connected to one of said highway output circuits for said intermediate matrix, the output circuits of each matrix of said third group being connected to the lines of a different one of said group of lines, and a plurality of gate means for each matrix of said third group, each of which is selectively operative to establish a connection between one of the highway outputs from said intermediate matrix and one of said output circuits for its matrix which is connected to one of said lines in its associated group of lines.

8. A nonblocking three stage switching arrangement for switching "N" number of inputs to "N" number of outputs, said inputs being divided into "*g*" number of groups, each of which groups is comprised of "*n*" number of inputs, and said outputs being divided into "*g*" number of groups, each of which groups is comprised of "*n*" number of outputs, a first one of said switching stages comprising a "*g*" number of switching matrices, each of which matrices has its inputs connected respectively to the "*n*" inputs of one of the "*g*" input groups and having at least $2n-1$ output time division channels on a plurality "*p*" of time division multiplex highways, each highway having "*t*" time slots, and means for selectively establishing connection between each of the "*n*" inputs and said at least $2n-1$ output time division channels; a third one of said switching stages comprising "*g*" number of switching matrices, each matrix having its outputs connected respectively to the "*n*" outputs of one of the "*g*" output groups and having at least $2n-1$ input time division channels on a plurality "*p*" of time division multiplex highways, each highway having "*t*" time slots, and means for selectively establishing connection between said at least $2n-1$ input time division channels and said "*n*" outputs; and at least one intermediate switching stage comprising "*p*" switching matrices, each of which is connected to a highway from each switching matrix of the first group, and each of which has a plurality of output highways, each of the different output highways being connected to a different one of the switching matrices of the third group, and means for selectively establishing connection between said inputs and said outputs of said intermediate switching stage.

9. In a communication switching system having a multistage switching arrangement for a plurality of groups of lines, each of which groups of lines is comprised of an "*n*" number of lines, and each of which lines is comprised of an incoming and outgoing branch, one of said stages comprising a group of matrices, each of which matrices has a plurality of input circuits, each of which input circuits is connected to the incoming branch of a different line of an associated one of said groups of lines, a plurality of time divided output highways having at least $2n-1$ channels, and a plurality of gate means for each of said input circuits, at least one of said gate means for an input circuit being selectively operative to connect its input circuit to one of said time divided highways, and at least one other of said gate means for the same input circuit being selectively operative to connect its input circuit to a second one of said time divided highways, and switching means connected to said first and second highways for selectively establishing connections from said output highways to the output branches of the lines in said groups.

10. In a communication switching system having a three stage switching arrangement for a plurality of N lines divided into groups, each of which groups is comprised of an "*n*" number of lines, said system comprising a first group of matrices, each of which matrices have a plurality of "*n*" input circuits, each of which input circuits is connected to a different line of an assoicated one of said groups, a plurality of "*p*" time divided output highways defined by the expression $\sqrt{2n/t}$ in which "*t*" is the number of time slots for a highway, at least one of said gate means for each input circuit being selectively operative to connect its input circuit to a first one of said time divided highways, and at least one other of said gate means for each input circuit being selectively operative to connect its input circuit to a second one of said time divided highways, at least a first and second intermediate matrix having a plurality of input circuits, the input circuits of said first intermediate matrix being connected to said first highways from said matrices in said first group, and the input circuits of said second intermediate matrix being connected to said second highways from said matrix in said first group, a plurality of highway output circuits for said intermediate matrices, and a plurality of gate means for each intermediate matrix, said gate means for each matrix being operative to selectively interconnect the input and output circuits of its matrix, and a third group of matrices, each of which includes a plurality of input circuits and a plurality of output circuits each of which input circuits is connected to one of said highway output circuits for said intermediate matrix, the output circuits of each matrix of said third group being connected to the lines of a different one of said groups of lines and a plurality of gate means for each matrix of said third group, each of which is selectively operative to establish connection between an input circuit for its matrix which is connected to a highway output of one of said intermediate matrices and an output circuit of its associated matrix which is connected to one of the lines in its associated group of lines.

11. A nonblocking three stage switching arrangement for switching "N" number of incoming branches of N lines to "N" number of outgoing branches of said N lines, said N lines being divided into "*g*" number of groups, each of which groups is comprised of "*n*" incoming branches, a first one of said switching stages comprising a number "*g*" of switching matrices, each of which matrices has inputs connected to the incoming branch of one of said "*g*" groups and having at least $2n-1$ number of output channels on a plurality of time division multiplex highways; and means for establishing connection between each of the "*n*" incoming branches and said $2n-1$ output channels; a third one of said switching stages comprising "*g*" number of switching matrices, each having "*n*" output branches therefrom and at least $2n-1$ input channels on a plurality of time division multiplex highways; means for selectively establishing connection between said $2n-1$ input channels and said "*n*" output branches, and a second one of said switching stages comprising a plurality of switching matrices equal in number to one of said plurality of time division multiplex highways, each matrix of which has an input highway from each switching matrix of the first group, and an output highway to each switching matrix of the third group, and means for selectively establishing connections in each second stage matrix between the input highways and said output highways of said second stage matrix.

12. A three stage switching arrangement for switching "N" number of incoming branches to "N" number of output branches, said incoming branches being divided into "*g*" number of groups each of which groups is comprised of "*n*" incoming branches, a first one of said switching stages comprising a "*g*" number of switching matrices, each of which matrices being connected to one of said "*g*" groups of incoming branches and having outputs comprised of a first plurality of time division highways; and means for establishing connection between each of the "*n*" incoming branches and said outputs; a third one of said switching stages comprising "*g*" number of switching matrices, each having "*n*" output branches therefrom and inputs comprising a second plurality of time division multiplex highways; means for selectively establishing connection between said inputs for said third switching stage and said "*n*" output branches, and a second one of said switching stages comprising a plurality of switching matrices equal in number to said second plurality of time division highways, and means for selectively establishing connection in each second stage matrix between said outputs of said first switching stage matrix and said inputs to said matrices in said third switching stage.

13. A three stage switching arrangement for switching input branches to output branches, said input branches being divided into a plurality of input groups, each of which input groups comprises an "*n*" number of input branches; and said output branches being divided into output groups, each of which output groups comprises an "*m*" number of output branches; a first one of said switching stages comprising a number of switching matrices equal in number to the number of input groups, each of which matrices has "*n*" inputs connected to the branches of one of said input groups and has outputs comprising a first plurality of time division multiplex highways, and means for selectively establishing connection between each of the "*n*" inputs and said first plurality of time division multiplex highway outputs; a third one of said switching stages comprising a number of switching matrices equal in number to said groups of output branches, each of which matrices has outputs connected to the "*m*" output branches of one of said groups of output branches and has inputs comprising a second plurality of time division multiplex highways, and means for selectively establishing connection between each of the "*m*" outputs and said second plurality of time division multiplex highways; and a second one of said switching stages comprising a plurality of switching matrices, each of which has an input from each switching matrix of the first group, and an output to each switching matrix of the third group, and means in each switching matrix in said second stage for selectively establishing connections between said inputs and outputs for its switching matrix.

References Cited

UNITED STATES PATENTS

| | | | |
|---|---|---|---|
| 3,129,407 | 4/1964 | Paull | 340—147 |
| 3,223,784 | 12/1965 | Inose et al. | 179—15 |
| 3,028,581 | 4/1962 | Thorpe | 340—166 |
| 3,291,914 | 12/1966 | Bowers | 179—18 |
| 3,336,443 | 8/1967 | Benmussa et al. | 179—22 |

ROBERT L. GRIFFIN, Primary Examiner

CARL R. VON HELLENS, Assistant Examiner

U.S. Cl. X.R.

179—18; 340—147, 166

PO-1050
(5/69)

UNITED STATES PATENT OFFICE
CERTIFICATE OF CORRECTION

Patent No. 3,458,658 Dated July 29, 1969

Inventor(s) Enn Aro

It is certified that error appears in the above-identified patent and that said Letters Patent are hereby corrected as shown below:

Column 8, line 30, the formula reading $\Sigma = 2pn + \frac{4N^2}{pt^2}$ should read $\Sigma = 2pN + \frac{4N^2}{pt^2}$ Column 8, between lines 45 and 50, that portion of the formula reading $p = \sqrt{\frac{2N}{t}}$ should read $p = \frac{\sqrt{2N}}{t}$ Column 8, between lines 50 and 55, the formula reading $p = \sqrt{\frac{4096}{32}} = \frac{64}{32} = 2$ should read $p = \frac{\sqrt{4096}}{32} = \frac{64}{32} = 2$ Column 10, line 1, the formula reading $p = \sqrt{N/t}$ should read $p = \frac{\sqrt{2N}}{t}$

SIGNED AND
SEALED
MAY 12 1970

(SEAL)
Attest:

Edward M. Fletcher, Jr.
Attesting Officer

WILLIAM E. SCHUYLER, JR.
Commissioner of Patents